United States Patent [19]

Tanaka

[11] Patent Number: 5,361,864
[45] Date of Patent: Nov. 8, 1994

[54] FRONT WHEEL SUSPENSION FOR MOTORCYCLE

[75] Inventor: Toyoji Tanaka, Iwata, Japan

[73] Assignee: Yamaha Hatsudoki Kabushiki Kaisha, Iwata, Japan

[21] Appl. No.: 963,436

[22] Filed: Oct. 19, 1992

Related U.S. Application Data

[63] Continuation-in-part of Ser. No. 796,417, Nov. 22, 1991, abandoned.

[30] Foreign Application Priority Data

Nov. 30, 1990 [JP] Japan .................. 2-340847

[51] Int. Cl.$^5$ .......................................... B62K 21/02
[52] U.S. Cl. ................... 180/219; 280/661; 280/276; 280/772
[58] Field of Search ............... 180/219, 227; 280/661, 280/275, 276, 277, 286, 772

[56] References Cited

U.S. PATENT DOCUMENTS

| | | | |
|---|---|---|---|
| 4,526,249 | 7/1985 | Parker | 180/219 |
| 4,741,545 | 5/1988 | Homma et al. | 180/210 |
| 4,775,025 | 10/1988 | Parker et al. | 180/219 |
| 4,785,905 | 11/1988 | Trema | 180/219 |
| 4,834,408 | 5/1989 | de Cortanze | 180/219 |
| 5,014,808 | 5/1991 | Savard et al. | 180/219 |
| 5,050,699 | 9/1991 | Savard | 280/276 |
| 5,121,809 | 6/1992 | Sbarro | 280/772 |
| 5,188,192 | 2/1993 | Sbarro | 180/219 |

FOREIGN PATENT DOCUMENTS 58-49435 11/1983 Japan .
62-103277 5/1987 Japan .
62-181988 8/1987 Japan .
62-194987 8/1987 Japan .
63-184583 7/1988 Japan .
63-215478 9/1988 Japan .
2246892 10/1990 Japan .
3-2889 1/1991 Japan .
3136994 6/1991 Japan .
3136995 6/1991 Japan .
3136996 6/1991 Japan .
3248985 11/1991 Japan .
3248986 11/1991 Japan .

Primary Examiner—Brian L. Johnson
Assistant Examiner—Kevin Hurley
Attorney, Agent, or Firm—Knobbe, Martens, Olson & Bear

[57] ABSTRACT

The present invention is adapted to be embodied in a steering and suspension arrangement for the front wheel of a motorcycle. Specifically, the invention relates to a front wheel swing arm type steering and suspension arrangement. In the arrangement of the present invention, upper and lower swing arms connect a motorcycle frame to a steering knuckle which extends along one side of the front wheel. The invention provides means for adjusting the relative lateral positioning between the steering knuckle and the upper swing arm for suspension tuning. The invention also provides a relative positioning arrangement between the upper swing arm and the steering knuckle which minimizes forwards and backwards lateral movement of the suspension arrangement when the swing arms are moved up and down, as when the motorcycle encounters a bump during operation.

29 Claims, 11 Drawing Sheets

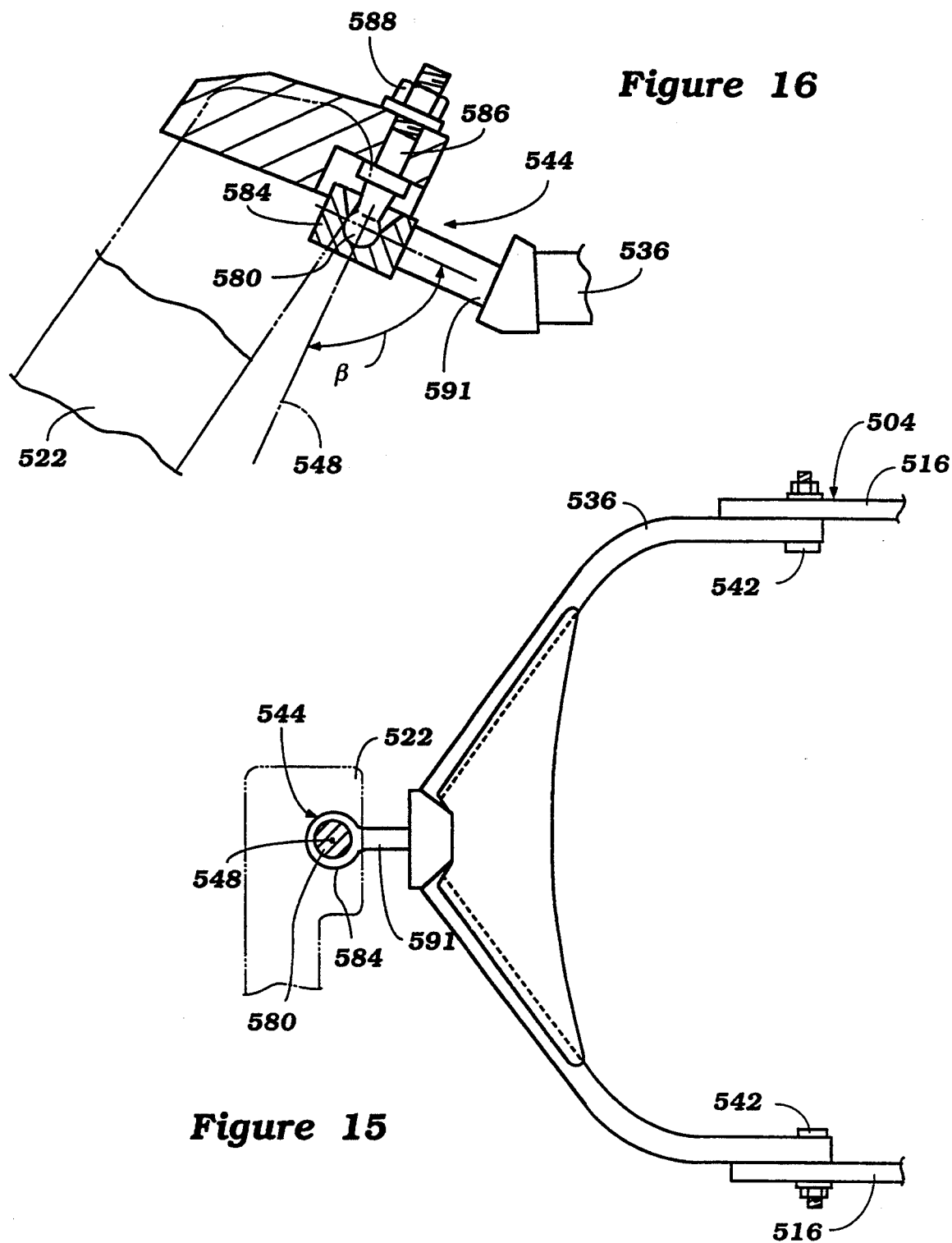

FRONT WHEEL SUSPENSION FOR MOTORCYCLE

This application is a continuation-in-part of application Ser. No. 07/796,417, filed Nov. 22, 1991 now abandoned.

BACKGROUND OF THE INVENTION

This invention relates to improvements in motorcycles and more particularly to a suspension and steering arrangement for the front wheel of a motorcycle.

Rear swing arm suspensions are now well known in the motorcycle industry and have become rather common in recent years. In such suspension systems, the rear wheel of the motorcycle is journaled to the end of a U-shaped fork, or swing arm. The swing am is hinged to the frame of the motorcycle and extends rearwardly. The rear swing arm and wheel undergo generally vertical swinging motion in response to road shocks and changing weight loads. The swing arm is spring loaded downwardly, typically by means of a compression spring, so that the swing arm can bear ordinary weight loads as well as road shocks. Various combinations of shock absorbers, dampers, and springs have been used to spring load and damp the swing arm. Road shocks and changing weight loads are typically transmitted via swinging motion of the swing arm to a shock absorber that incorporates a damper as well as the compression spring that provides the necessary downward force on the swing arm. There is commonly provided some mechanism for adjusting the spring force applied to the swing arm in order to adjust the ride of the motorcycle or to accommodate different riders, differing weight loads or changed road conditions.

Traditionally, front suspension systems of motorcycles have not been as well developed. Until relatively recently, motorcycles have been virtually universally equipped with a fork-type front end suspension system. The fork tubes are connected through a head assembly to a rotatable steering column which is journaled to the frame of the motorcycle. The axle of the front wheel is journaled to the lower ends of the fork tubes. Such designs have a recognized disadvantage in that all weight loads and road shocks on the front wheel are transmitted up through the front fork to the frame of the motorcycle, at a point on the frame which is well above and forward of the center of gravity of the motorcycle. This results in the front fork, the attached steering head, and the upper portions of the frame all being necessarily stronger, and thus heavier, than would be necessary to merely bear the suspension loads on the front wheel of the motorcycle. It also results in the entire front suspension system turning with the front wheel, when all that needs to be turned to effect steering is the front wheel, thus increasing the steering effort and the amount of unsprung mass of the front wheel.

In a co-pending patent application entitled, "Double Swing Arm Motorcycle Front Suspension," filed on Nov. 1, 1991 (Ser. No. 07/786,733) and naming as inventors Toyoji Tanaka, the inventor of the present invention, and additionally, Ichiro Kurawaki and Kazumasa Nakaya, and assigned to the assignee hereof, there is disclosed a motorcycle having a one-sided front swing am suspension system. The system of that application includes upper and lower control arms which are hinged to the frame of the motorcycle and which extend forwardly from the frame to a steering knuckle (also known as a kingpin). The steering knuckle extends along one side of the front wheel at a rake angle (i.e., the steering knuckle extends at an angle upwardly and rearwardly from the wheel axle to the steering column) which is similar to the rake angle of a conventional telescoping fork, and curves around the outer periphery of the wheel. A substantial rake angle is necessary and desirable to obtain satisfactory motorcycle steering response, and is also desirable because it renders the suspension most effective in absorbing road shocks.

The front wheel is journaled in a cantilevered fashion to an axle which extends transversely from the lower end of the steering knuckle. The lower control arm is arcuate and extends alongside of and around the front wheel. The lower control arm is connected to the lower end of the steering knuckle by means of a ball joint which allows the front wheel to be steered while also allowing swinging motion of the control arm. The upper control arm extends forwardly from the frame of the motorcycle and is connected to the upper end of the steering knuckle, at a location above the front wheel, also by means of a ball joint. The upper and lower control arms swing in parallel so as to absorb road shocks and weight loads on the front wheel.

A one-sided front swing arm suspension arrangement, similar in certain major respects to that just described, is also set forth in U.S. Pat. No. 4,526,249 to James G. Parker, issued on Jul. 2, 1985. Details of this suspension arrangement are disclosed in the '249 patent, which is expressly incorporated herein by reference.

It has been recognized that one primary advantage of the one-sided front swing arm suspension has been that weight and shock loads on the front wheel can be effectively borne by the motorcycle frame at a point low and close to the center of gravity of the frame, rather than at the point where the steering column is journaled to the frame.

However, as recognized in the above-identified co-pending patent application, a problem which may be encountered when employing a swing arm front wheel suspension system for a motorcycle involves the forwards and backwards lateral movement of the arrangement as the swing arms move through their respective arcs about axes defined by the points at which the swing arms connect to the motorcycle's frame. It is desirable that such forwards and backwards lateral movement be kept to a minimum.

Additionally, it has been recognized that a means for fine tuning the relative positioning between the swing arms and steering knuckle in front swing arm type suspension systems is desirable. Sometimes a rider may prefer a different camber angle of the front wheel in front swing arm arrangements. A fine tuning system could allow for the ready tuning of the suspension system until the desired camber angle of the front wheel is achieved. Of course, it is most desirable to have a fine tuning system that is easy to operate and which does not add excessive bulk or weight to a motorcycle front swing arm type suspension arrangement.

It is, therefore, an object of this invention to provide an improved suspension and steering arrangement for the front wheel of a motorcycle.

It is further an object of this invention to provide a one-sided front swing arm suspension system for a motorcycle which minimizes any forwards and backwards lateral movement of the arrangement encountered during any swinging motion of the swing arms during motorcycle operation.

It is yet another object of this invention to provide a one-sided front swing arm suspension system for a motorcycle which can be readily tuned for accurate performance.

SUMMARY OF THE INVENTION

The present invention is adapted to be embodied in a steering and suspension arrangement for a motorcycle. In a first feature of the invention, a steering and suspension arrangement is provided for the front wheel of a motorcycle. The first feature comprises a frame, a steering knuckle extending along one side of the front wheel, a swing arm having first and second ends, and a first connection whereat the first end of the swing arm is connected at the frame and a second connection whereat the second end of the swing arm is connected proximate the steering knuckle. The second connection is movable through an arc. The arc has upper and lower maximum positions. Also provided is a steering axis which passes through the second connection. The front wheel and the steering knuckle are rotatable about the steering axis. A longitudinal line extending through a portion of the swing arm nearest the second connection forms a right angle with respect to the steering axis when the second connection is positioned at a midpoint of the arc; that is, between the arc's upper and lower maximum positions. Further provided is a means for adjusting the relative lateral positioning between the steering knuckle and the swing arm.

In a second feature of the invention an alignment adjusting arrangement is provided for a steering and suspension system for the front wheel of a motorcycle. The second feature comprises a frame, a steering knuckle extending along one side of the front wheel, an upper swing arm having first and second ends, and a first connection whereat the first end of the upper swing arm is connected at the frame and a second connection whereat the second end of the upper swing arm is connected proximate an upper portion of the steering knuckle. Also provided is a lower swing arm having first and second ends, a third connection whereat the first end of the lower swing arm is connected at the frame and a fourth connection whereat the second end of the lower swing arm is connected at a lower portion of the steering knuckle. Additionally, means are provided for adjusting the relative lateral positioning between the steering knuckle and one of the swing arms.

In a third feature of the invention a steering and suspension arrangement is provided for the front wheel of a motorcycle. The third feature comprises a frame, a steering knuckle extending along one side of the front wheel, a swing arm having first and second ends, and a first connection whereat the first end of the swing arm is connected at the frame and a second connection whereat the second end of the swing arm is connected proximate the steering knuckle. The second connection is movable through an arc. The arc has upper and lower maximum positions. Also provided is a steering axis which passes through the second connection. The front wheel and the steering knuckle are rotatable about the steering axis. A longitudinal line extending through a portion of the swing arm nearest the second connection forms a right angle with respect to the steering axis when the second connection is positioned at a midpoint of the arc; that is, between the arc's upper and lower maximum positions.

BRIEF DESCRIPTION OF THE DRAWINGS

FIG. 15 is a cross-sectional view taken along the line 15—15 of FIG. 12.

FIG. 16 is an enlarged side view, with portions shown in section, of the front wheel suspension arrangement in accordance with the second feature of the present invention.

DETAILED DESCRIPTION OF THE PREFERRED EMBODIMENT

Figure 1:
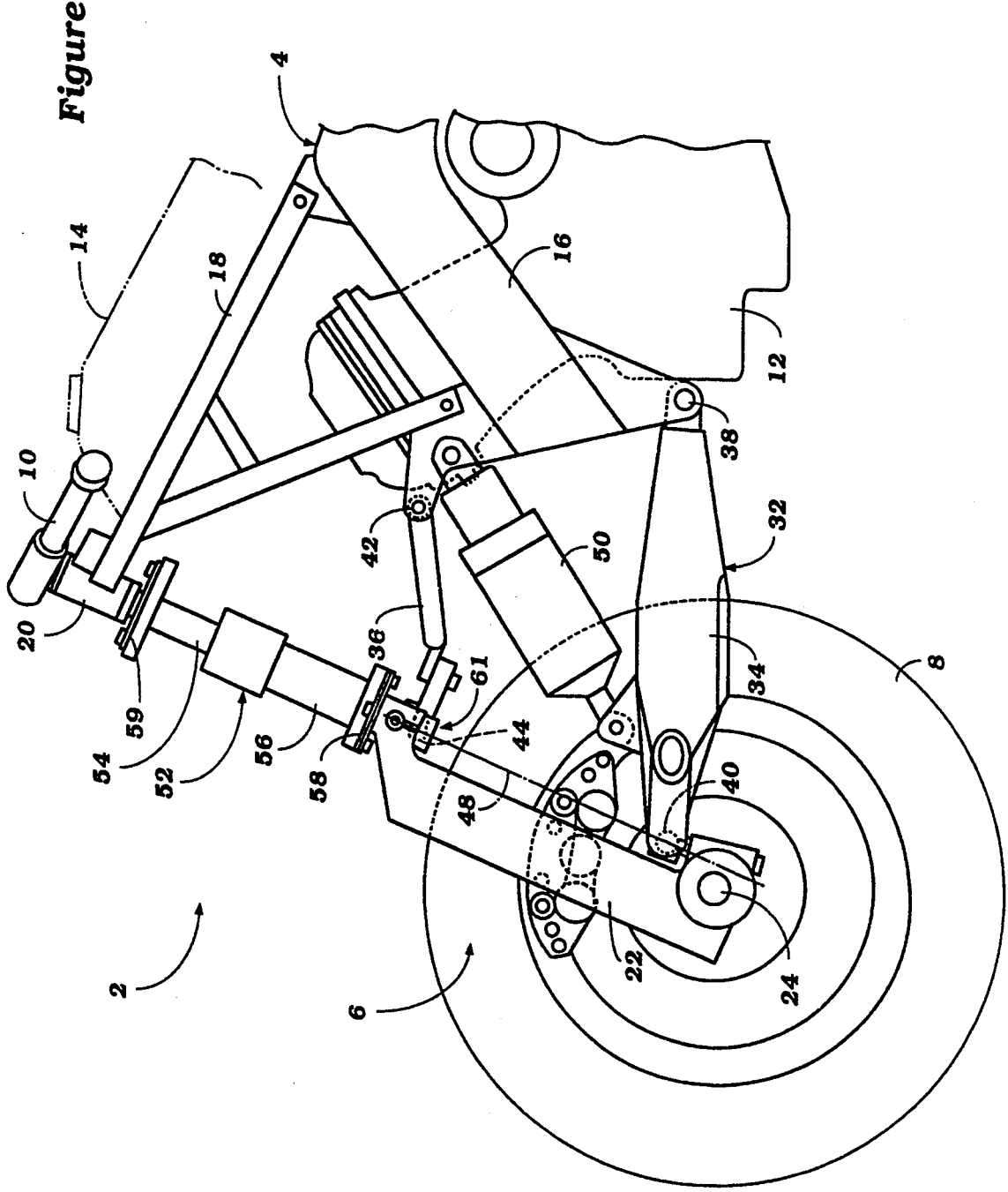
FIG. 1 is a side elevational view, with portions shown in phantom, of a forward portion of a motorcycle equipped with a front wheel suspension arrangement constructed in accordance with a first feature of the present invention.
Figure 2:
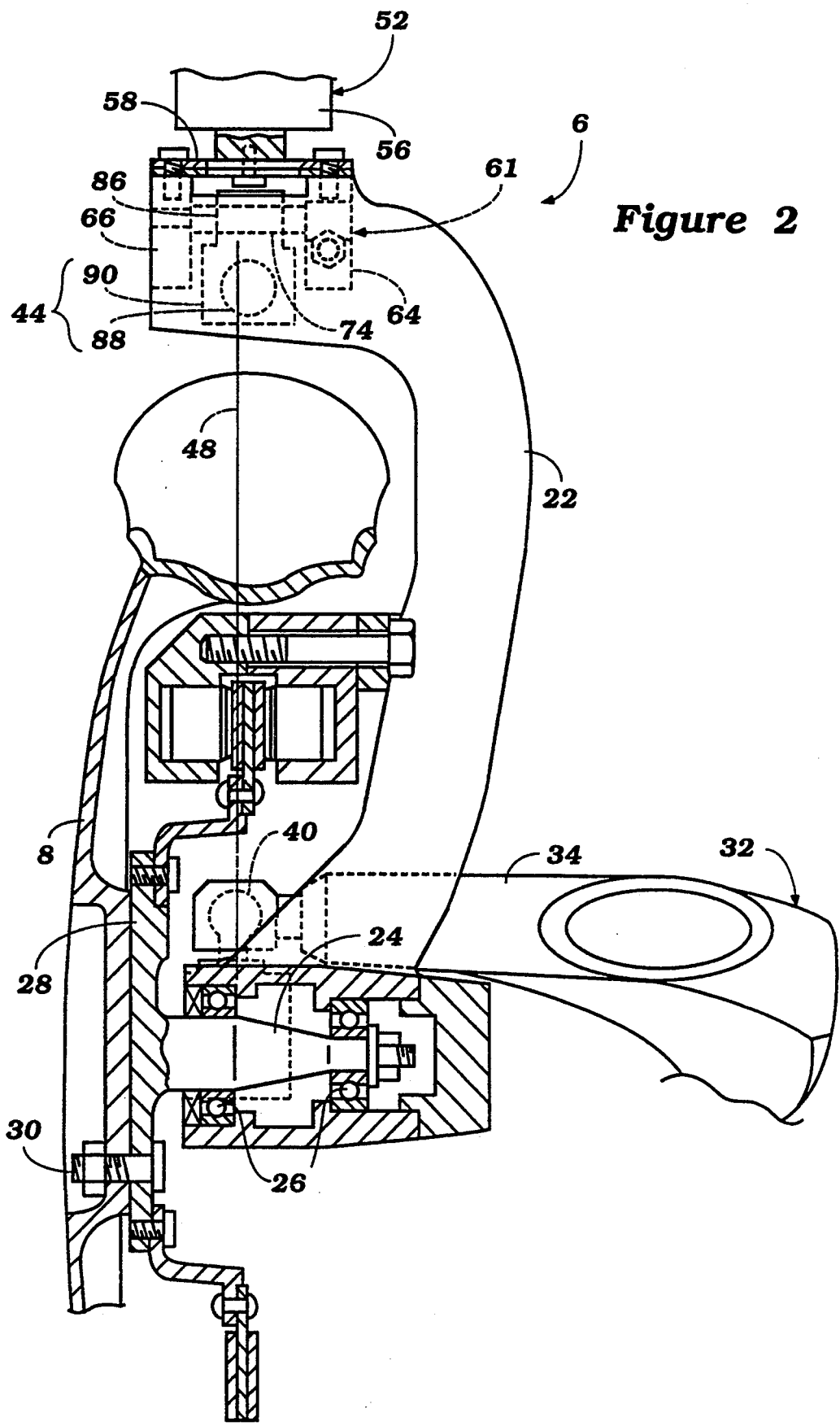
FIG. 2 is a front cross-sectional view, with portions shown in phantom, of the front wheel suspension arrangement as constructed in accordance with the first feature of the invention.
Figure 3:
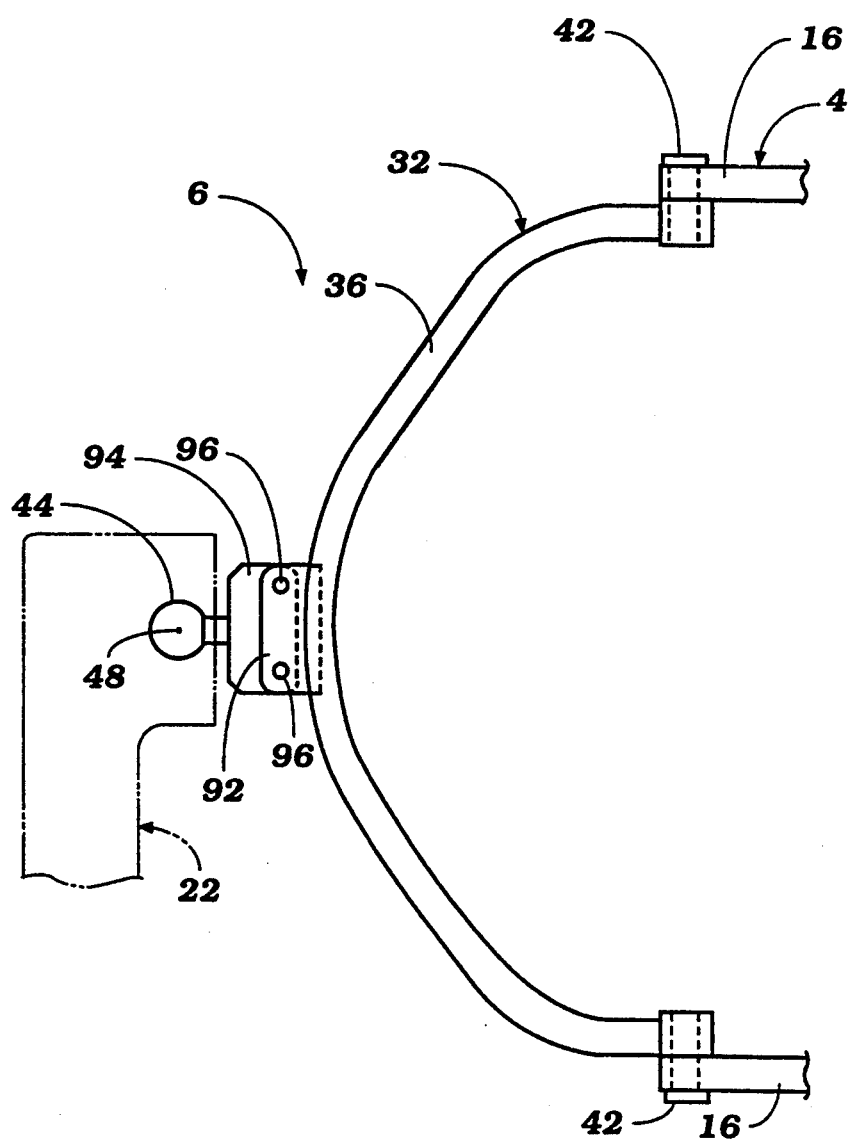
FIG. 3 is a top plan view of an upper swing arm and ball joint connection of the front wheel suspension arrangement as constructed in accordance with the first feature of the invention.

Referring first to FIGS. 1 through 3, a motorcycle, indicated generally by the reference numeral 2, is shown which incorporates features of the present invention. The present invention concerns a front wheel suspension system, and next several features of the invention will be described in connection with the particular motorcycle construction of FIGS. 1 through 3. It should be noted, however, that the invention is not limited to the illustrative motorcycle construction, and may be employed with any construction which permits operation of the suspension system to be hereinafter detailed.

The motorcycle 2, as illustrated, includes a body frame and a front wheel suspension system, denoted generally by the reference numerals 4 and 6, respectively. A steerable front wheel 8 is rotatably supported by the front wheel suspension system 6. A handle bar 10 is mounted above the front wheel 8. Further included is an engine, illustrated in simplified form and denoted by the reference numeral 12, and a fuel tank, shown in phantom and denoted by the reference numeral 14. The engine 12 may be of any suitable type, such as an electronically fuel injected, four cylinder in-line type, four cycle engine.

The body frame 4 is provided with a pair of main brackets 16, with one bracket 16 lying on each side of the engine 12. Thus, the engine 12 is, in effect, sandwiched between the brackets 16. The brackets 16 are tightly connected to one another by a cross member (not shown). At a forward portion of the brackets 16 there is formed a steering frame 18 which, when viewed from the side as in FIG. 1, is in the form of a triangle projecting upward and forwardly at its uppermost corner. A head pipe 20 is mounted along this projecting corner of the steering frame 18 and supports the handle bar assembly 10.

The above-mentioned front wheel suspension device 6 is of the so-called wishbone type and has a steering knuckle (also known as a kingpin) 22 located to the left side of the front wheel 8, relative to a seated operator. A wheel shaft or axle 24 extends into and is journaled in a bearing assembly 26 formed in the lower end of the steering knuckle 22, as shown in FIG. 2. A flange 28 is formed on the right-hand side of the wheel shaft 24. The front wheel 8 is secured by bolts 30 to the flange portion 28, so that the front wheel 8 may be supported by the lower end of the steering knuckle 22.

The steering knuckle 22 is supported, for upward and downward movement, along the forwardmost portion of the main brackets 16 by a linkage arrangement, denoted generally by the reference numeral 32. The linkage arrangement 32 specifically includes pair of control arms, having a lower arm 34 and an upper arm 36. The lower arm 34 is pivotally connected to a forward, lower end of the brackets 16 about a pivot shaft 38. The lower arm 34 has a forwardmost rocking end to which the lower portion of the steering knuckle 22 is connected via a ball joint 40.

As particularly illustrated in FIG. 3, the upper arm 36 has a rearwardly extending U-shape. The rearwardmost ends of the rearwardly extending left and right sides of the upper arm 36 are pivotally connected to the main brackets 16 through respective pivot shafts 42. The upper arm 36 is swingable about the pivot shafts 42 and has a forwardmost end to which an upper portion of the steering knuckle 22 is connected by way of another ball joint 44. Together, the lower and upper ball joints, 40 and 44, permit universal pivotal motion between the steering knuckle 22 and each of the control arms, 34 and 36.

The axis extending from the lower and upper ball joints, 40 and 44, represents the steering axis 48 about which the steering knuckle 22 and front wheel 8 are steerable.

A hydraulic shock absorber 50 is provided between a front upper portion of the main brackets 16 and the lower arm 34. The shock absorber 50 is operative to maintain the lower arm 34 and steering knuckle 22 in a predetermined position by absorbing shocks transmitted from the front wheel 8 to the body frame 4 by way of extending and contracting motions.

Cooperating with these extending and contracting motions of the shock absorber 50 is a telescoping tube arrangement 52 disposed between the steering knuckle 22 and the handle bar assembly 10. This cooperating arrangement 52 is composed of a sliding shaft 54, mounted to a lower end of the handle bar arrangement 10 through a blade spring 59, and a casing 56, mounted on an upper end of the steering knuckle 22 through a blade spring 58. The sliding shaft 54 has a protruded end slidably inserted into the casing 56 along its axial direction.

Thus, steering of the front wheel 8 is accomplished by turning the handle bar assembly 10 about the steering axis 48, and occurs through the telescoping tube arrangement 52 and the steering knuckle 22. During operation of the motorcycle 2, when vertical movement is imparted to the steering knuckle, for example when the front wheel 8 encounters a bump, the sliding shaft 54 slides relative to the casing 56 in order to absorb variations in the vertical positioning of the steering knuckle 22 relative to the handle bar assembly 10. Further, the blade springs 58 and 59 function to absorb the variation of the relative inclination of the steering knuckle 22, handle bar assembly 10 and the telescoping tube arrangement 52.

Figure 5:
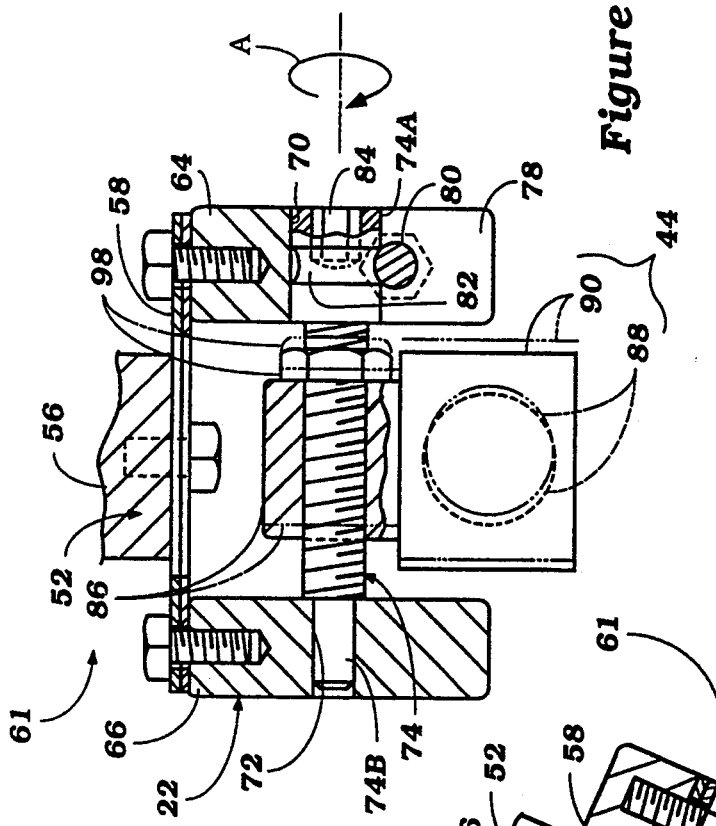
FIG. 5 is a cross-sectional view taken along the lines 5—5 of FIG. 4.
Figure 4:
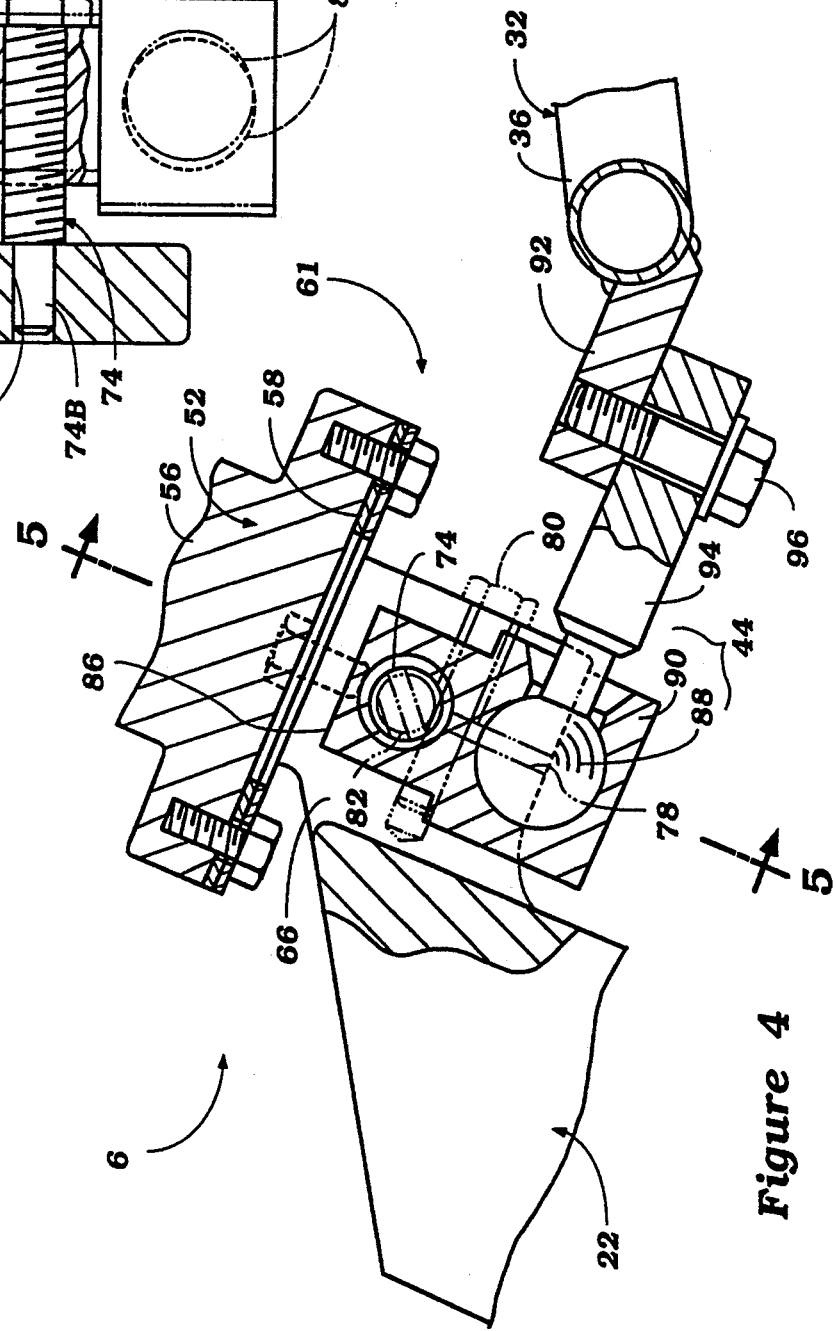
FIG. 4 is an enlarged side view of a first embodiment of a front wheel alignment adjusting system of the front wheel suspension arrangement as constructed in accordance with the first feature of the present invention.

Referring now to FIGS. 4 and 5, in addition to FIGS. 1 through 3, the alignment adjusting device 61 of this invention will be described in detail. The alignment adjusting device is located in the region where the steering knuckle 22 and the upper arm 36 are connected to one another.

The steering knuckle 22, on the left and right along its upper rear side, is provided with a pair of rearward protrusions 64 and 66. The protrusions 64 and 66 have a pair of coaxial, horizontal bores 70 and 72 integrally formed therein. A screw shaft, generally denoted by the reference numeral 74, extends therethrough in a generally horizontal fashion, perpendicular with respect to the steering axis 48. The left side 74A of the screw shaft 74 is inserted into the left bore 70 and the right side 74B of the screw shaft 74 is inserted into the right bore 72. The screw shaft 74 is supported within the bores 70 and 72 in such a manner that the shaft 74 is rotatable about its axis.

A slot 78 is formed within the left protrusion 64, with the slot 78 extending downwardly from the bore 70 formed therein. A fastening bolt 80 extends through a hole which traverses the length of the protrusion 64 in a direction running perpendicular to the plane of the slot 78. Thus, upon tightening of the fastening bolt 80 the opposing portions of the left protrusion 64 which are adjacent the slot 78 are brought closer together, thereby securing the left side 74A of the screw shaft 74 within the left bore 70 and preventing its rotation.

A groove 82 is formed about the periphery of the left end 74A of the screw shaft 74. An intermediate portion of the fastening bolt 80 lies within the groove 82 of the screw shaft left end 74A. This arrangement ensures that the left end 74A of the screw shaft 74 remains in place within the left bore 70, and thus determines the lateral positioning of the screw shaft 74. The outer face of the left end 74A of the screw shaft 74 is provided with a hexagonal hole 84 capable of receiving a hexagon spanner.

A nut body 86 is provided with a threaded interior for receiving the screw shaft 74 therein. A lock nut 98 is in threading engagement with the screw shaft 74 and is positioned thereabout between the left protrusion 64 and the nut body 86. Proximate to the nut body 86, lies the upper ball joint 44. This ball joint 44 is composed of a ball 88 and a ball receiver 90. The ball receiver 90 supports the ball 88. The ball receiver 90 is integrally formed along the lower end of the nut body 86.

A bracket plate 92 is welded in place along the front upper end of the upper arm 36. A support plate 94, for supporting the ball 88, is detachably secured to the bracket plate 92 by a pair of bolts 96.

The operation procedures of the alignment adjusting device 61 of this invention, of the construction just described, will next be described, with particular reference to FIG. 5.

First, the fastening bolt 80 is loosened in order to make the screw shaft 74 readily rotatable. Also, the lock nut 98 is loosened so the screw shaft 74 will be rotatable relative to the nut body 86. Then, a spanner is inserted in the engaging hole 84 and is rotated in a direction as shown by the arrow A in FIG. 5. Consequently, the nut body 86 is displaced from the position as shown by the phantom lines in FIG. 5 to the position as shown by the solid lines, thereby changing the position of the upper portion of the steering knuckle 22 relative to the upper arm 36.

Thus, the lateral positioning of the steering knuckle 22 can be adjusted about the lower ball joint 40, at which the steering knuckle 22 and lower swing arm 34 are connected. By changing the positioning of the steering knuckle 22, and thereby the front wheel 8, any camber angle of the front wheel 8 may be adjusted to zero.

When such adjustments have been completed, the lock nut 98 is rotated to fasten it against the nut body 86 so as to inhibit relative movement between the screw shaft 74 and the nut body 86. The fastening bolt 80 is also fastened in order to inhibit any further rotation of the screw shaft 74. The alignment adjusting procedure is thereby completed.

It is to be noted that the steering knuckle 22 is capable of being moved laterally with respect to the frame of the motorcycle since, as set forth above, the blade springs 58 and 59 are functional to absorb variations of relative inclination between the steering knuckle 22, the handle bar assembly 10, and the telescoping tube arrangement 52. That is, the blade springs 58 and 59 can accommodate changes in lateral positioning between the steering knuckle 22 and associated elements of the motorcycle structure which may be incurred during the above-described adjustment procedures.

In the embodiment described above, corresponding to the illustrations of FIGS. 1 through 5, the screw shaft 74 is operatively associated with the upper arm 36 via the nut body 86 mounted proximate the steering knuckle 22. However, it is to be understood that the alignment adjusting device 61 could instead be disposed between the bracket plate 92 and the support plate 94.

Instead of providing the alignment adjusting device 61 in the region whereat the steering knuckle 22 and the upper arm 36 are connected, as set out above, the device 61 may be positioned along the region at which the steering knuckle 22 and the lower arm 34 connect together. In the latter arrangement, however, due to a relatively large external force acting upon the connecting portion of the steering knuckle 22 and lower arm 34, the structure would be large and complicated. For this reason, the preferred mode of this invention employs the alignment adjusting device 61 along the region whereat the steering knuckle 22 and upper arm 36 are connected.

FIGS. 6 through 8 and FIGS. 9 and 10 illustrate further embodiments of the alignment adjusting device of the present invention. Since the fundamental structure and function of each of these further embodiments are substantially the same as those in the above-discussed first embodiment, similar components are designated by similar reference numerals in these Figures. The further embodiments of FIG. 6 through 8 and FIGS. 9 and 10, as described below, are discussed only to the extent that they differ in structural and functional details as compared to the first embodiment described above.

Figure 6:
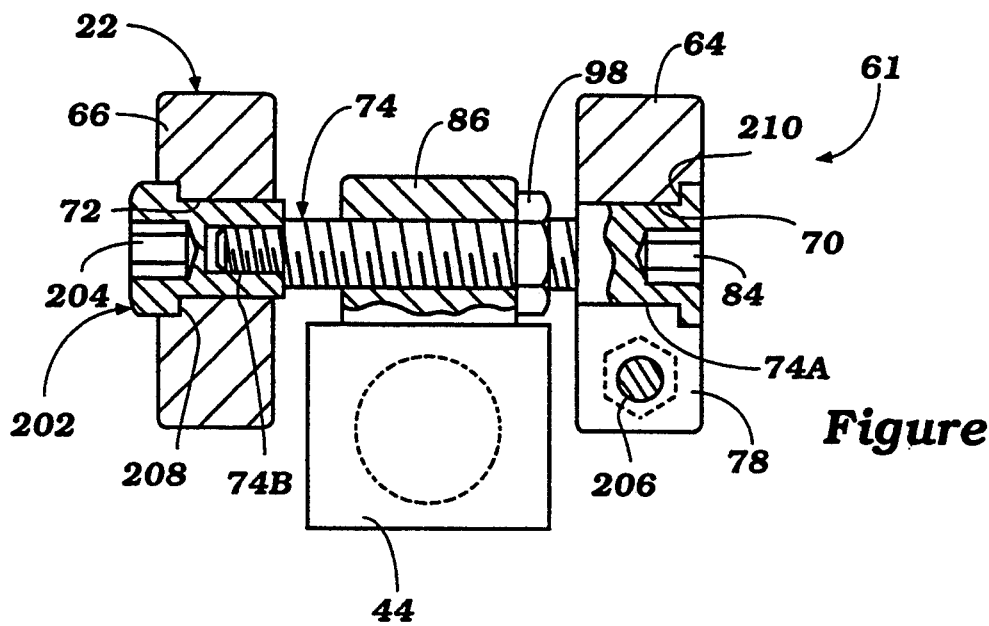
FIG. 6 is a cross-sectional view, similar to FIG. 5, showing a second embodiment of the alignment adjusting system of the invention.

FIG. 6 illustrates a second embodiment of the alignment adjusting device 61. In the second embodiment, a nut 202 which is rotatable about its central axis is inserted into the right bore 72. The right end of the screw shaft 74 is provided with threads which engage mating threads located within the nut 202. The nut 202 is provided with a spanner engaging polygonal hole 204, which is similar to the hole 84 on the left side 74A of the screw shaft 74. A fastening bolt 206, similar to the fastening bolt 80 of the first embodiment, is provided across the slit 78.

Flanged extension portions 208 and 210 are formed about the nut 202 and the left side 74A of the screw shaft 74, respectively. Upon fastening the nut 202 on the right side 74B of the screw shaft 74, the flanged portions 208 and 210 engage the outer sides of the protrusions 66 and 64, from areas therein where the flanged portions are seated, with an inwardly directed force. After adequate fastening in such a manner, further rotation of the screw shaft 74 within the bores 70 and 72 will thereby be prohibited. At a subsequent time, when the nut 202 is loosened from the right end 74B of the screw shaft 74, the screw shaft 74 then becomes freely rotatable.

Figure 7:
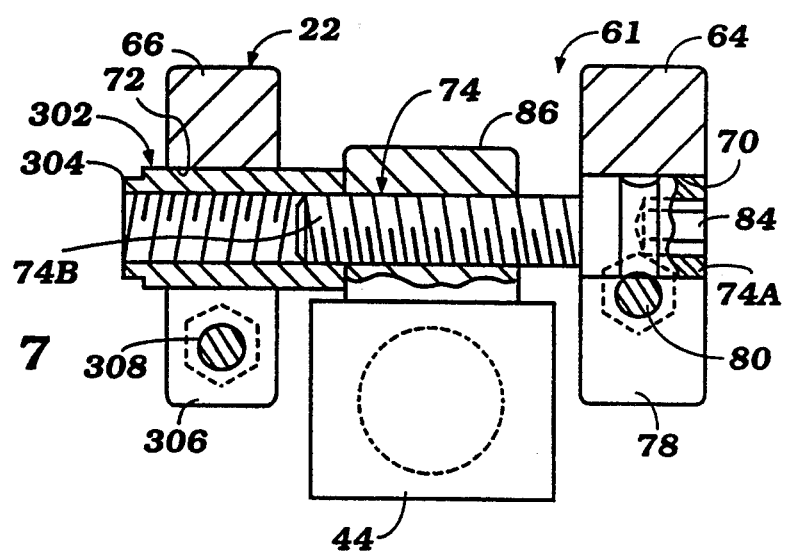
FIG. 7 is a cross-sectional view, similar to FIG. 5, showing a third embodiment of the alignment adjusting system of the invention.

FIG. 7 illustrates a third embodiment of the alignment adjusting device 61. In the third embodiment, a cylindrical nut 302, which is rotatable about is longitudinal axis, is inserted into the right bore 72 of the right protrusion 66. The right end of the screw shaft 74 is provided with threads which engage mating threads located within the cylindrical nut 302. Together, the cylindrical nut 302 and the screw shaft 74 support the nut body 86 in place proximate to the steering knuckle 22.

The cylindrical nut 302 serves to function as a lock nut which holds the nut body 86 in place with respect to the two protrusions 64 and 66. A spanner engaging portion 304 is provided at the outer end of the cylindrical nut 302 for turning the cylindrical nut 302, as desired. A slit 306, similar to the slit 78, is formed within the right protrusion 66. A fastening bolt 308 is also provided, which may be fastened in order to prevent rotation of the cylindrical nut 302 within the right bore 72.

Figure 8:
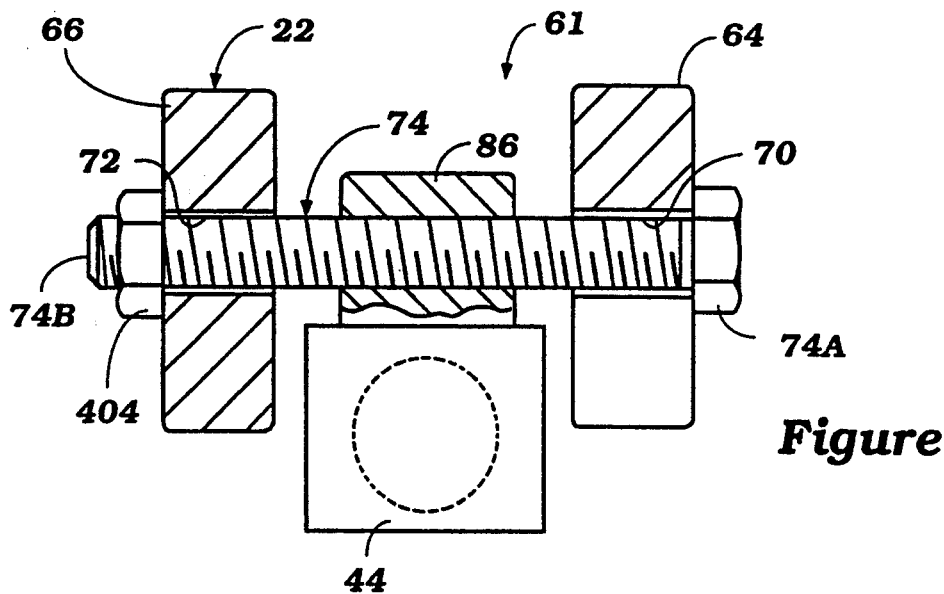
FIG. 8 is a cross-sectional view, similar to FIG. 5, showing a fourth embodiment of the alignment adjusting system of the invention.

FIG. 8 illustrates a fourth embodiment of the alignment adjusting device 61. In the fourth embodiment, the screw shaft 74 is of a commercially available type, having a bolt head at the left end 74A thereof. The right end engages a nut 404 by way of a threading arrangement, as is well known.

Upon fastening the nut 404 to the right end 74B of the screw shaft 74, the head of the screw shaft 74 at its left end 74A and the nut 404 press inwardly on the left and right protrusions 66 and 64, until further rotation of the screw shaft 74 is inhibited.

It should be clear that the four embodiments of the above-described alignment adjusting device, as detailed above, all readily permit for the tuning of the front wheel suspension and steering system of the invention. Specifically, utilizing any one of the above screw shaft and nut body arrangements, the relative lateral positioning between the steering knuckle and the upper swing arm can be adjusted about an axis comprising the lower ball joint connection, whereat the steering knuckle adjoins the lower swing arm, until the desired camber angle of the front wheel is achieved.

As discussed above, the alignment adjusting mechanism of the present invention may be located along any of the various portions of the motorcycle front wheel suspension arrangement. For example, an adjusting mechanism in accordance with the invention could be located along rearward portions of the upper and/or the lower swing arm, proximate the frame of the motorcycle.

Figure 9:
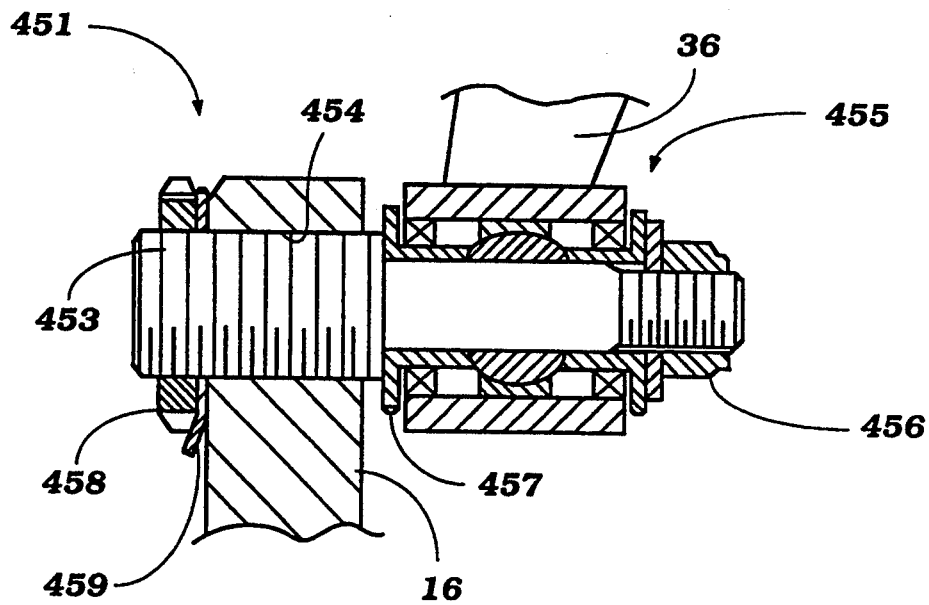
FIG. 9 is an enlarged cross-sectional front view of a portion of an alignment adjusting mechanism for the motorcycle front wheel suspension arrangement as constructed in accordance with a fifth embodiment of the invention.
Figure 10:
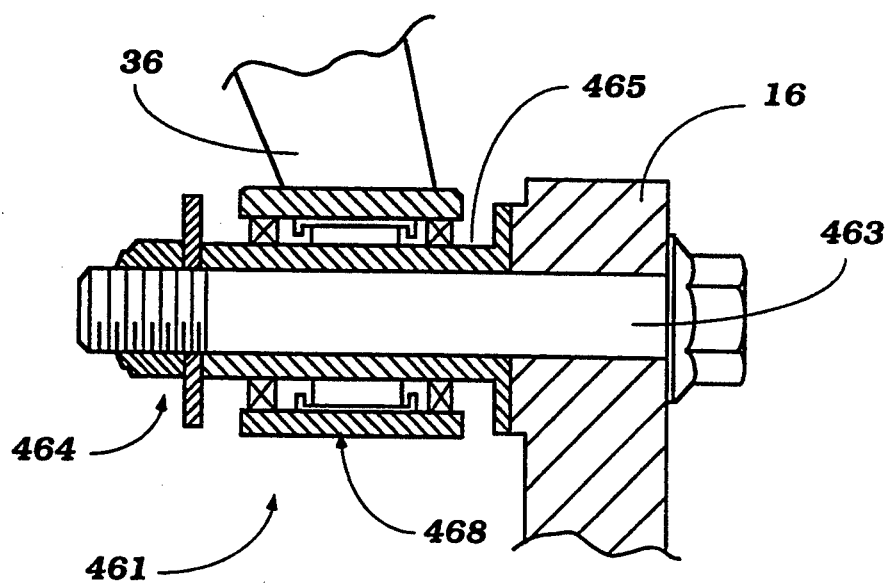
FIG. 10 is an enlarged cross-sectional front view of another portion of the alignment adjusting mechanism of the embodiment of the invention shown in FIG. 9.

FIGS. 9 and 10 are enlarged cross-sectional front views of portions of an alignment adjusting mechanism for the motorcycle front wheel suspension arrangement as constructed in accordance with a fifth embodiment of the invention. Specifically, FIGS. 9 and 10 depict an embodiment of the adjusting mechanism, as contemplated by the invention, which is positioned along a region whereat an upper swing arm of the motorcycle suspension connects to a frame of the motorcycle.

FIG. 9 shows an adjusting device 451 which is located at one of the two connections between the upper swing arm 36 and the motorcycle frame 16. The adjusting device 451 is operative to adjust, and secure, the position of the upper swing arm 36 laterally with respect to the motorcycle frame 16. Specifically a threaded screw shaft 453 is received within a mating bore 454 formed in a portion of the frame 16. A clamp arrangement 455 holds one side of the swing arm 36 adjacent the screw shaft 453. The clamp arrangement 455 includes a nut 456 which secures a portion of the swing arm 36 abutting against a shoulder 457. The clamp arrangement 455 allows pivoting of the swing arm 36 to take place in relation to the frame 16, during operation of the motorcycle, even though the lateral positioning of these elements is fixed as desired. Rotation of the screw shaft 453 within the bore 454 permits relative lateral adjustment between the swing arm 36 and the frame 16. Once a desired relative lateral positioning is obtained, a nut 458 about the screw shaft can be tightened against the frame and then secured via a nut lock (such as a tab washer 459) so that the desired relative lateral positioning will be maintained.

FIG. 10 shows a structure 461 which is complementary to the adjusting device 451 of FIG. 9 and which is located at the other of the two connections between the upper swing arm 36 and the motorcycle frame 16. This complementary structure 461 includes a sleeve or bearing portion 468 which is slidable about the longitudinal axis of a guide arrangement. Such sliding permits this other side of the upper swing arm 36 to also move laterally with respect to motorcycle frame 16 as the adjusting device 451 is operated. As depicted in FIG. 10, the guide assembly includes a bolt 463 which extends through a portion of the frame 16, and a nut/washer combination 464 which holds a collar 465 in place about the shaft of the nut. The sleeve 468 may slide across the collar laterally and may also pivot thereabout as necessary depending upon the prevailing operational conditions.

The present invention also addresses the particular geometric arrangement of certain components of the front wheel swing arm suspension arrangement. This aspect of the invention is described below in connection with a motorcycle construction which differs in some respects from the construction described above. Again, it should be noted, however, that the invention is not limited to the illustrative motorcycle construction, and may be employed with any construction which permits operation of the suspension system of the invention.

Figure 11:
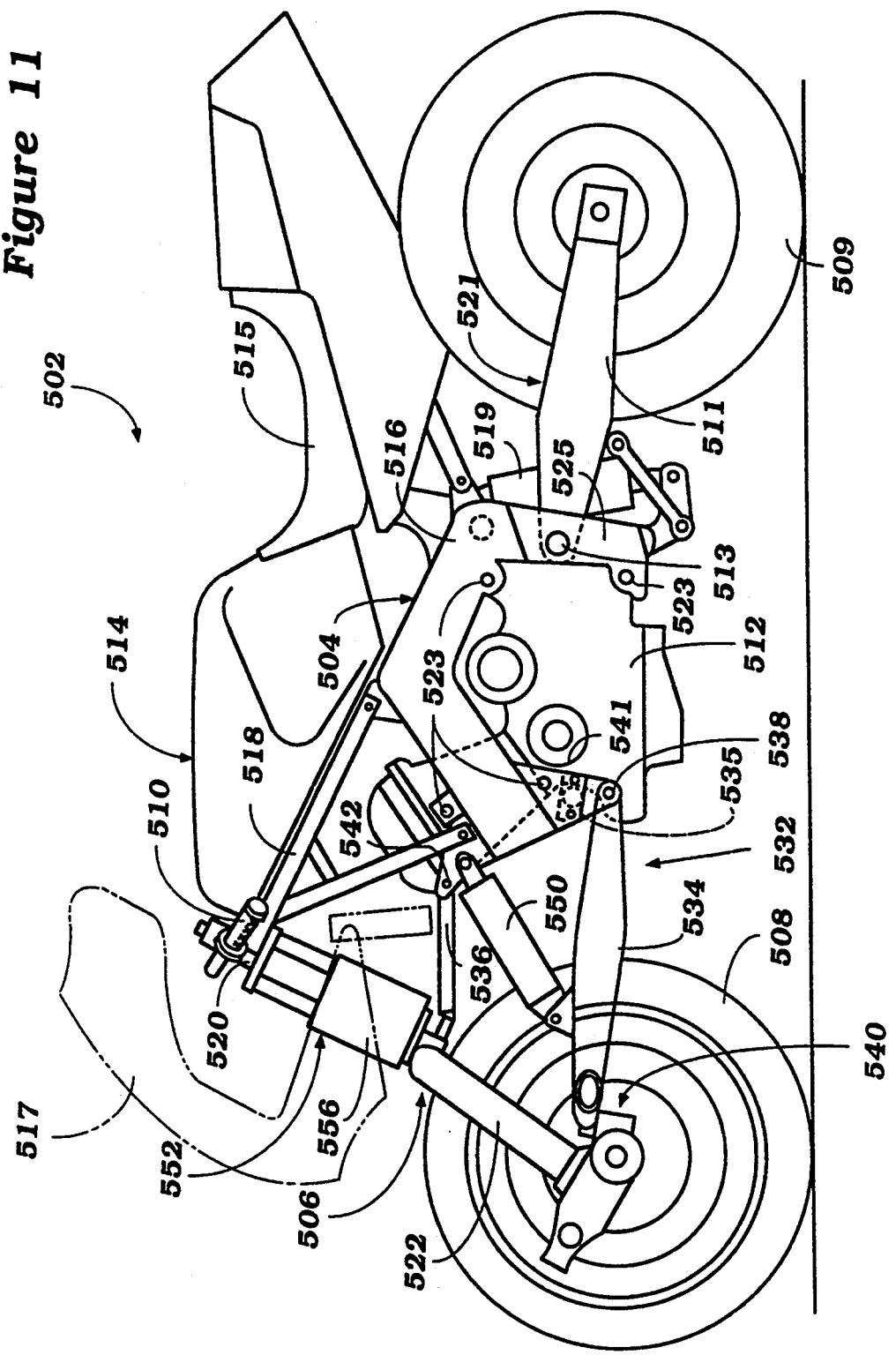
FIG. 11 is a side elevational view of a motorcycle having a front wheel suspension arrangement constructed in accordance with a second feature of the present invention.

FIG. 11 is a side elevational view of the additional motorcycle construction, indicated generally by the reference numeral 502, with which the present invention may be employed and in connection with which the particular geometric arrangement of certain components of the front wheel swing arm suspension arrangement will next be described. The motorcycle 502 includes generally a front wheel 508, a rear wheel 509, and an engine 512. Also, other various conventional components are included; for example, a handlebar arrangement 510, a fuel tank 514, a seat 515, and a cowling arrangement 517.

A body frame and a front wheel suspension system are provided and are denoted generally by the reference numerals 504 and 506, respectively. The front wheel 508 is steerable and is supported by the front wheel suspension system 506. The handle bar assembly 510 is mounted above the front wheel 508.

It should be noted that the motorcycle construction as depicted in FIG. 11 employs a rear swing arm suspension system, denoted generally by the reference numeral 521, in addition to the front spring suspension system of the invention 506. The rear wheel 509 is journaled to the end of a U-shaped fork or swing arm 511. The rear swing arm 511 is hinged to a rearward portion 525 of the frame 504 of the motorcycle 502 about a pivot axis 513 and extends rearwardly. The rear swing arm 511 and wheel 509 undergo vertical swinging motion in response to road shocks and varying weight loads. The swing arm 511 is spring loaded downwardly, by way of a shock absorber 519, so that the swing arm 511 can bear ordinary weight loads as well as road shocks.

Figure 13:
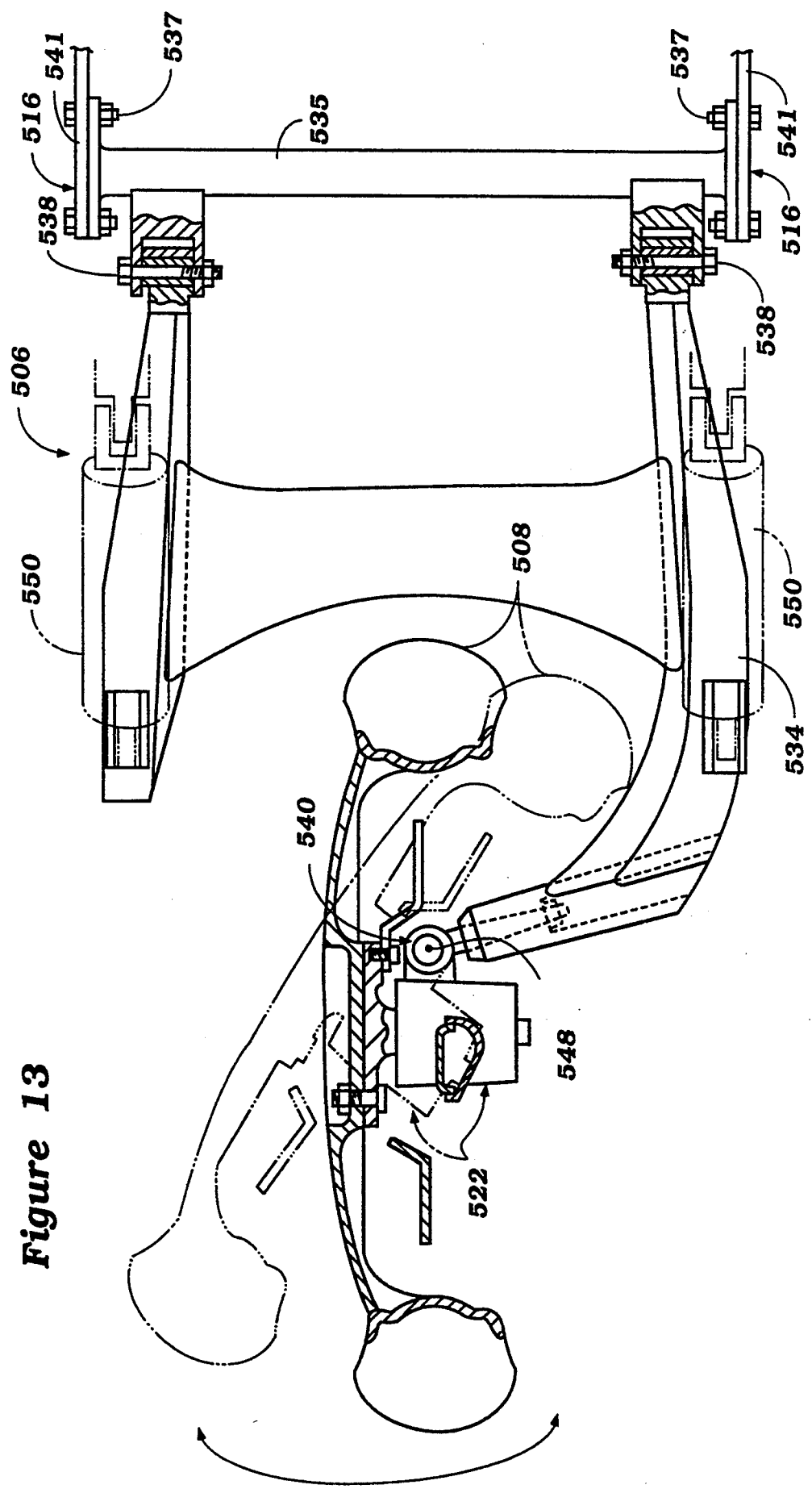
FIG. 13 is a cross-sectional view taken along the line 13—13 of FIG. 12.

The front swing arm suspension 506 of the motorcycle 502 is very similar to that of the motorcycle 2 illustrated in FIGS. 1 through 10. Specifically, the body frame 504 is provided with a pair of main brackets 516, with one bracket lying on each side of the engine 512. The brackets 516 are tightly connected to one another by a cross member 535 secured in place by bolts 537 at a forward section 541 of the brackets 516, as shown in FIG. 13. The engine 512 is attached to the brackets 516 by appropriate connections at various locations 523.

Figure 12:
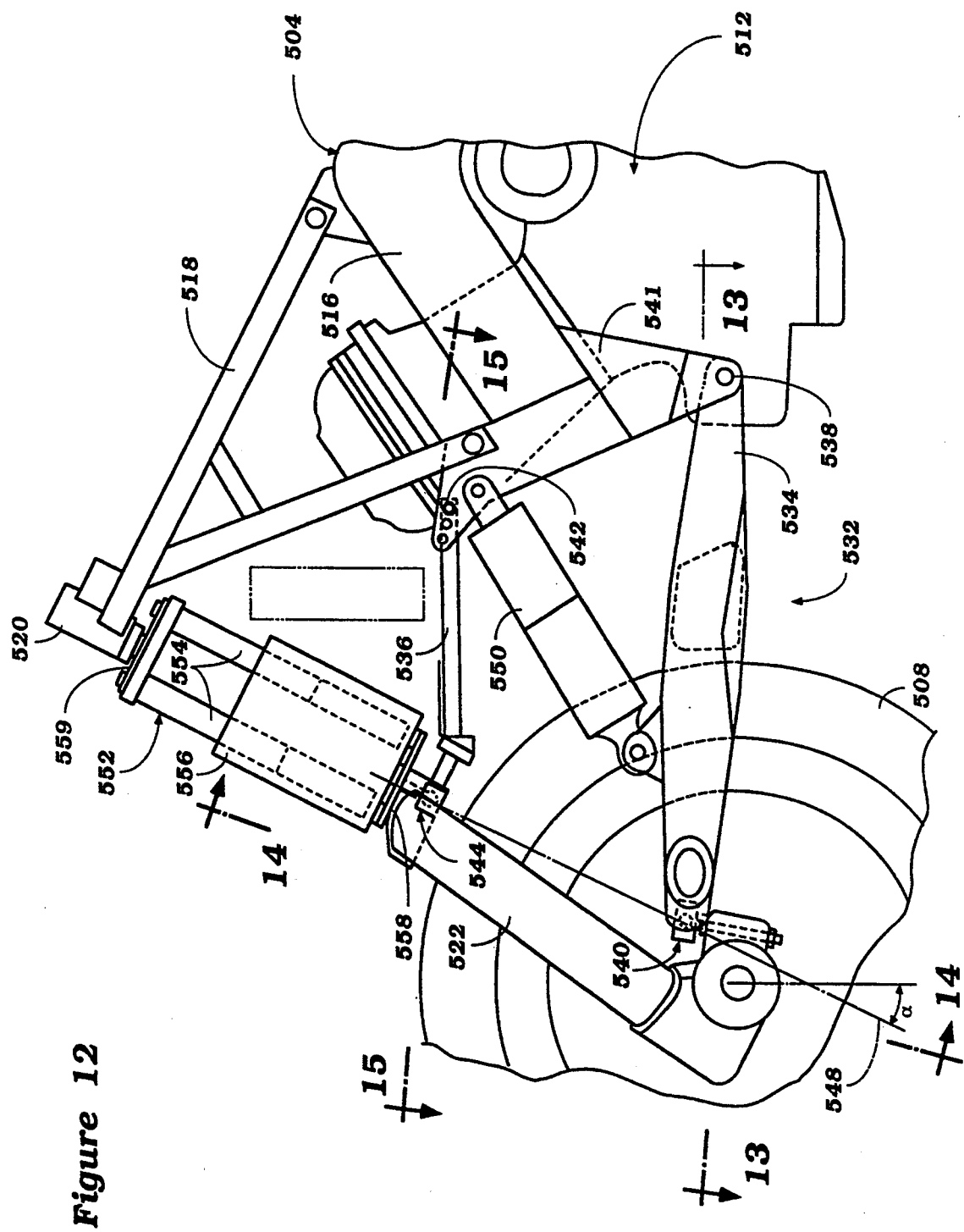
FIG. 12 is an enlarged partial side elevational view of a forward portion of the motorcycle of FIG. 11.

At a forward portion of the brackets 516 there is formed a steering frame 518 which, when viewed from the side as in FIGS. 11 and 12, is in the form of a triangle projecting upward and forwardly at its uppermost corner. A head pipe 520 is mounted along this projecting corner of the steering frame 518 and supports the handle bar assembly 510.

Figure 14:
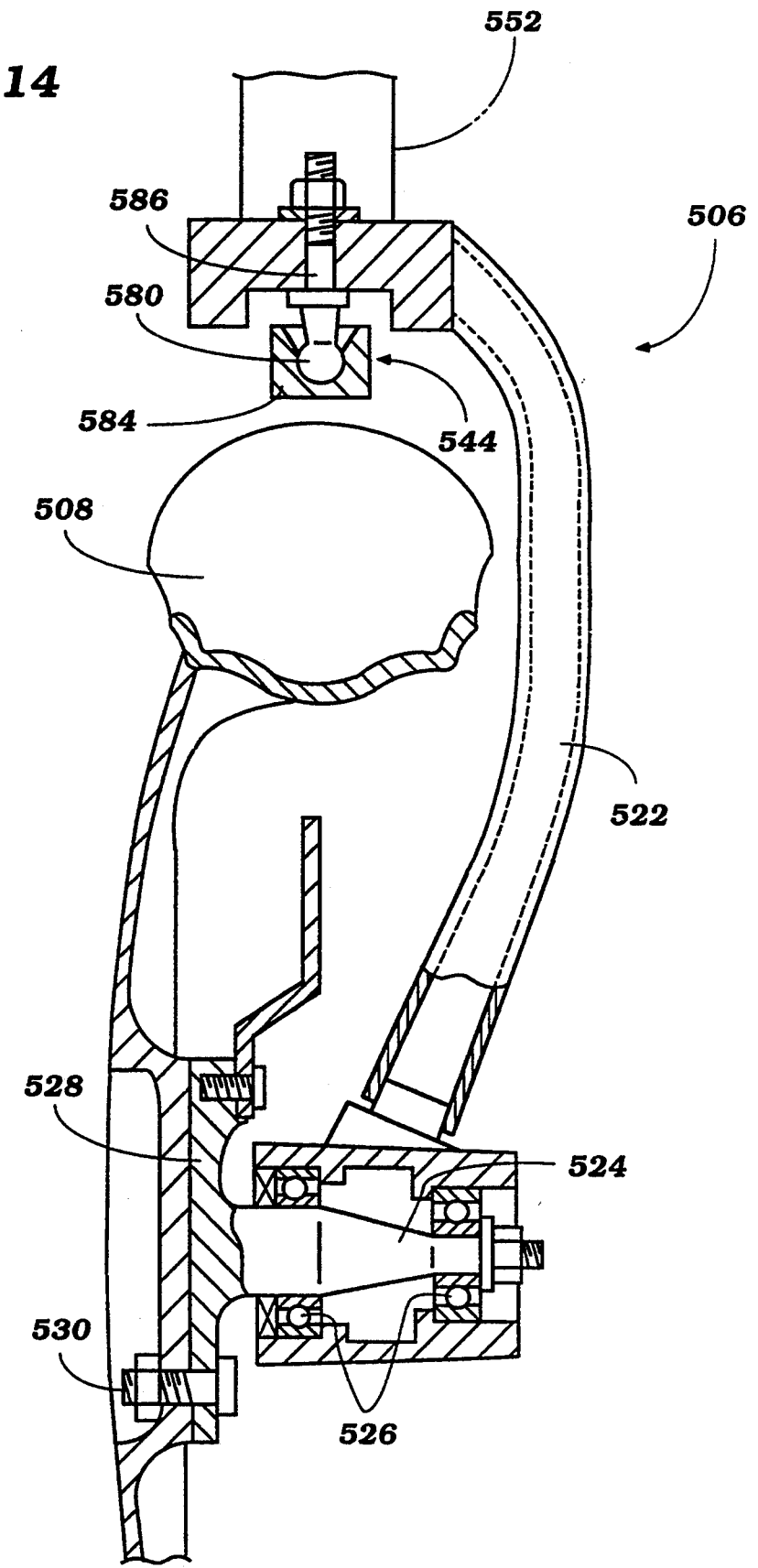
FIG. 14 is a cross-sectional view taken along the line 14—14 of FIG. 12.

The above-mentioned front wheel suspension device 506 is of the so-called wishbone type and has a steering knuckle (also known as a kingpin) 522 located to the left side of the front wheel 508, relative to a seated operator. A wheel shaft or axle 524 extends into and is journaled in a bearing assembly 526 formed in the lower end of the steering knuckle 522, as shown in FIG. 14. A flange 528 is formed on the right-hand side of the wheel shaft 524. The front wheel 508 is secured by bolts 530 to the flange portion 528, so that the front wheel 508 may be supported by the lower end of the steering knuckle 522.

The steering knuckle 522 is supported, for upward and downward movement, along the forwardmost portion of the main brackets 516 by a linkage arrangement, denoted generally by the reference numeral 532. The linkage arrangement 532 specifically includes pair of control arms, having a lower arm 534 and an upper arm 536. The lower arm 534 is pivotally connected to a forward, lower end of the brackets 516 about a pivot shaft 538. The lower arm 534 has a forwardmost rocking end to which the lower portion of the steering knuckle 522 is connected via a ball joint 540.

As particularly illustrated in FIG. 15, the upper arm 536 has a rearwardly extending U-shape. The rearwardmost ends of the rearwardly extending left and right sides of the upper arm 536 are pivotally connected to the main brackets 516 of the body frame 504 through respective pivot shafts 542. As shown in FIG. 12, the pivot shafts 542 may be variably positionable, as desired, among several holes; located along the upper region of the brackets 504. The upper arm 536 is swingable about the pivot shafts 542 and has a forwardmost end to which an upper portion of the steering knuckle 522 is connected by way of another ball joint 544. Together, the lower and upper ball joints, 540 and 544, permit universal pivotal motion between the steering knuckle 522 and each of the control arms, 534 and 536.

The axis extending from the lower and upper ball joints, 540 and 544, represents the steering axis 548 about which the steering knuckle 522 and front wheel 508 are steerable.

A hydraulic shock absorber 550 is provided between a front upper portion of the main brackets 516 and the lower arm 534. The shock absorber 550 is operative to maintain the lower arm 534 and steering knuckle 522 in a predetermined position by absorbing shocks transmitted from the front wheel 508 to the body frame 504 by way of extending and contracting motions. As shown in FIG. 13, the lower swing arm 534 may have a generally horizontal portion which arcs around the rear of the front wheel 508 thus permitting a pair of such hydraulic shock absorbers 550 to be employed.

Cooperating with the extending and contracting motions of the shock absorber(s) 550 is a telescoping tube arrangement 552 disposed between the steering knuckle 522 and the handle bar assembly 510. This cooperating arrangement 552 is composed of a pair of sliding shafts 554, mounted to a lower end of the handle bar arrangement 510 through a blade spring 559, and also a casing 556, mounted on an upper end of the steering knuckle 522 through a blade spring 558. The sliding shafts 554 each have a protruded end slidably inserted into the casing 556 along their axial directions.

Thus, steering of the front wheel 508 is accomplished by turning the handle bar assembly 510 about the steering axis 548, and occurs through the telescoping tube arrangement 552 and the steering knuckle 522. During operation of the motorcycle 502, when vertical movement is imparted to the steering knuckle, for example when the front wheel 508 encounters a bump, the sliding shaft 554 slides relative to the casing 556 in order to absorb variations in the vertical positioning of the steering knuckle 522 relative to the handle bar assembly 510. Further, the blade springs 558 and 559 function to absorb the variation of the relative inclination of the steering knuckle 522, handle bar assembly 510 and the telescoping tube arrangement 552.

Referring now particularly to FIG. 16, the specific geometric arrangement of the components in the upper ball joint region 544 will next be described. As shown in the Figure, the upper ball joint arrangement 544 includes a ball 580 which is held within a socket structure 584. Extending primarily upward and somewhat rearwardly from the ball 580, out of the socket structure 584, is a bolt 586 which extends through a top portion of the steering knuckle 522 and is secured thereto, as by way of a nut 588. A support plate 591 extends primarily rearward and somewhat downwardly from the socket structure 584. The rearwardmost end of the support plate 591 is attached to a forward portion of the upper swing arm 536.

The geometric arrangement of importance with regard to the invention involves the angular relationship between the steering axis 548 and an axis defined by a line running along the longitudinal direction of the support plate 591 and through the ball 580 of the upper ball joint 544. First, it is to be noted that the forwardmost portion of upper swing arm 536, and thus the upper ball joint 544 as well, are moveable through an arc, having upper and lower maximum positions, about the pivot axis 542. The steering axis 548 and the axis defined by the line running along the longitudinal direction of the support plate 591 and through the ball 580 of the upper ball joint 544, are shown as broken lines in FIG. 16. The latter axis is set to be perpendicular with respect to the steering axis 548 when the upper ball joint 544 is positioned at a midpoint of the arc; that is, between the arc's upper and lower maximum positions. Thus, under such a condition the angle $\beta$, shown in FIG. 16, is ninety degrees. Such an angular relationship minimizes the fore and aft movement of the suspension arrangement when the suspension arrangement is subjected to up and down movement, as when encountering a bump during operation of the motorcycle.

It should be readily apparent from the foregoing description that a number of embodiments of the invention have been described which provide an improved suspension and steering arrangement for the front wheel of a motorcycle, and relate, in particular, to a one-sided front swing arm suspension system for a motorcycle. Although a number of embodiments of the invention have been described, various changes and modifications may be made from those embodiments without departing from the spirit and scope of the invention, as defined by the appended claims.

I claim:

1. A steering and suspension arrangement for a front wheel of a motorcycle comprising: a frame, a steering knuckle extending along one side of said front wheel, a swing arm having first and second ends, a first connection whereat said first end of said swing arm is connected at said frame and a second connection whereat said second end of said swing arm is connected proximate said steering knuckle, said second connection movable through an arc, wherein said arc has upper and lower maximum positions; and further comprising a steering axis which passes through said second connection, said front wheel and said steering knuckle rotatable about said steering axis; wherein a longitudinal line extending through a portion of said swing arm nearest said second connection forms a right angle with respect to said steering axis when said second connection is positioned at a midpoint of said arc, between said upper and lower maximum positions; and further comprising means for adjusting the relative lateral positioning between said steering knuckle and said swing arm.

2. The steering and suspension arrangement of claim 1 wherein said swing arm is a first swing arm; and further comprising a second swing arm positioned below said first swing arm; wherein said adjusting means is located proximate said first swing arm proximate said second connection.

3. An alignment adjusting arrangement for a steering and suspension system for a front wheel of a motorcycle comprising: a frame, a steering knuckle extending along one side of said front wheel, an upper swing arm having first and second ends, a first connection whereat said first end of said upper swing arm is connected at said frame and a second connection whereat said second end of said upper swing arm is connected proximate an upper portion of said steering knuckle, a lower swing arm having first and second ends, a third connection whereat said first end of said lower swing arm is connected at said frame and a fourth connection whereat said second end of said lower swing arm is connected at a lower portion of said steering knuckle; and further comprising means for adjusting the relative lateral positioning between said steering knuckle and one of said swing arms.

4. The alignment adjusting arrangement of claim 3 wherein said first and third connections are pivotal connections.

5. The alignment adjusting arrangement of claim 3 wherein said second and fourth connections are ball joint connections.

6. The alignment adjusting arrangement of claim 5 wherein said upper swing arm is generally arcuately shaped, and further comprising a support plate extending forwardly from a forward portion of said upper swing arm.

7. The alignment adjusting arrangement of claim 6 further comprising a bracket plate interposed between, and attached to, both said support plate and a forward end of said upper swing arm.

8. The alignment adjusting arrangement of claim 6 further comprising a ball positioned at a forwardmost portion of said support plate.

9. The alignment adjusting arrangement of claim 6 further comprising a ball receiving socket positioned at a forwardmost portion of said support plate.

10. The alignment adjusting arrangement of claim 5 wherein said adjusting means is located proximate said second connection.

11. The alignment adjusting arrangement of claim 7 wherein said adjusting means is located between said bracket plate and said support plate.

12. The alignment adjusting arrangement of claim 3 further comprising means for locking said steering knuckle in place with respect to one of said swing arms.

13. The alignment adjusting arrangement of claim 10 wherein said adjusting means comprises a nut body integrally formed with said second connection, and first and second extensions of an upper portion of said steering knuckle; said nut body positioned in a region between said first and second extensions; each of said extensions having a bore formed laterally therethrough; said nut body having a threaded bore formed laterally therethrough, said nut body bore coaxially positioned with respect to said bores of said first and second extensions; and further comprising a rotatable threaded screw shaft, wherein said screw shaft is positioned within said threaded bore of said nut body, and wherein each end of said screw shaft is received within a respective bore of each of said steering knuckle extensions; so that rotation of said screw shaft within said nut body changes the relative lateral positioning between said nut body and said steering knuckle extensions.

14. The alignment adjusting arrangement of claim 3 wherein said second connection is movable through an arc, and wherein said arc has upper and lower maximum positions; and further comprising a steering axis which passes through said second connection, said front wheel and said steering knuckle rotatable about said steering axis; wherein a longitudinal line extending through a portion of said upper swing arm nearest said second connection forms a right angle with respect to said steering axis when said second connection is positioned at a midpoint of said arc, between said upper and lower maximum positions.

15. An alignment adjusting arrangement for a steering and suspension system for a front wheel of a motorcycle comprising: a frame, a steering knuckle extending alone one side of said front wheel, an upper swing arm having first and second ends, a first connection whereat said first end of said upper swing arm is connected at said frame and a second connection whereat said second end of said upper swing arm is connected proximate an upper portion of said steering knuckle, a lower swing arm having first and second ends, a third connection whereat said first end of said lower swing arm is connected at said frame and a fourth connection whereat said second end of said lower swing arm is connected at a lower portion of said steering knuckle; and further comprising a swing arm positioned adjustment mechanism located on one of said swing arms proximate one of said steering knuckle and said frame.

16. The alignment adjusting arrangement of claim 15 wherein said swing arm position adjustment mechanism is located at said first connection.

17. The alignment adjusting arrangement of claim 16 wherein said swing arm position adjustment mechanism includes means for adjusting the relative lateral positioning between said frame and said swing arm.

18. The alignment adjusting arrangement of claim 16 wherein said swing arm position adjustment mechanism includes a plurality of variably positioned attachment points along an upper, forwardly located portion of said frame at which said first connection can be located.

19. The alignment adjusting arrangement of claim 17 wherein said adjusting means includes a rotatable threaded screw shaft portion received within a mating bore in said frame; wherein said adjusting means further includes a clamping portion which holds part of said swing arm adjacent said threaded screw shaft portion so that rotation of said screw shaft portion within said mating bore causes said clamping portion to move, thereby changing the relative lateral positioning between said frame and said swing arm 20. The alignment adjusting arrangement of claim 19 wherein said first end of said upper swing arm has two attachment points whereat said upper swing arm is connected to said frame; wherein said adjusting means comprises one of said two attachment points; and wherein the second of said two attachment points is comprised of a guide and bearing arrangement.

21. A steering and suspension arrangement for a front wheel of a motorcycle comprising: a frame, a steering knuckle extending along one side of said front wheel, a swing arm having first and second ends, a first connection whereat said first end of said swing arm is connected at said frame and a second connection whereat said second end of said swing arm is connected proximate said steering knuckle, said second connection movable through an arc, wherein said arc has upper and lower maximum positions; and further comprising a steering axis which passes through said second connection, said front wheel and said steering knuckle rotatable about said steering axis; wherein a longitudinal line extending through a portion of said swing arm nearest said second connection forms a right angle with respect to said steering axis when said second connection is positioned at a midpoint of said arc, between said upper and lower maximum positions.

22. The steering and suspension arrangement of claim 21 further comprising a lower swing arm having first and second ends, a third connection whereat said first end of said lower swing arm is connected at said frame and a fourth connection whereat said second end of said lower swing arm is connected at a lower portion of said steering knuckle.

23. The steering and suspension arrangement of claim 22 wherein said first and third connections are pivotal connections.

24. The steering and suspension arrangement of claim 22 wherein said second and fourth connections are ball joint connections.

25. The steering and suspension arrangement of claim 21 wherein an upper, forwardly located portion of said frame is provided with a plurality of variably positioned attachment points at which said first connection can be located.

26. The steering and suspension arrangement of claim 21 wherein said swing arm is generally arcuately shaped, and said portion of said swing arm nearest said second connection comprises a support plate extending forwardly from a forward portion of said arcuate swing arm.

27. The steering and suspension arrangement of claim 26 further comprising a ball receiving socket positioned at a forwardmost portion of said support plate.

28. The steering and suspension arrangement of claim 26 further comprising a ball positioned at a forwardmost portion of said support plate.

29. The steering and suspension arrangement of claim 21 further comprising means for adjusting the relative lateral positioning between said steering knuckle and said swing arm.

* * * * *